United States Patent [19]

Nichols et al.

[11] Patent Number: 4,901,348

[45] Date of Patent: Feb. 13, 1990

[54] DATA TRANSMISSION SECURITY ARRANGEMENT FOR A PLURALITY OF DATA STATIONS SHARING ACCESS TO A COMMUNICATION NETWORK

[75] Inventors: John M. Nichols, Arvada; Richard A. Windhausen, Thornton, both of Colo.

[73] Assignees: American Telephone and Telegraph Company, New York, N.Y.; AT&T Information Systems Inc., Morristown, N.J.

[21] Appl. No.: 812,974

[22] Filed: Dec. 24, 1985

[51] Int. Cl.[4] ...................... H04L 11/16; H04L 11/26
[52] U.S. Cl. .......................................... 380/6; 380/25; 380/49; 340/825.5; 340/825.52; 370/60; 455/1; 455/58
[58] Field of Search ................................ 364/200, 900; 340/825.52, 825.5, 825.51; 370/60, 94, 62; 455/58, 1; 379/204–206; 380/6–8, 23–25, 49–50

[56] References Cited

U.S. PATENT DOCUMENTS

| | | | |
|---|---|---|---|
| 3,725,870 | 4/1973 | Felcheck et al. | 364/200 |
| 4,131,849 | 12/1978 | Freeburg et al. | 455/58 |
| 4,217,550 | 8/1980 | Blassel et al. | 455/1 |
| 4,317,213 | 2/1982 | DiLorenzo | 455/1 |
| 4,334,322 | 6/1982 | Clark, III | 455/1 |
| 4,378,602 | 3/1983 | Umetsu et al. | 455/1 |
| 4,411,017 | 10/1983 | Talbot | 380/31 |
| 4,451,827 | 5/1984 | Kahn et al. | 370/94 |
| 4,498,193 | 2/1985 | Richardson | 455/1 |
| 4,590,468 | 5/1986 | Stieglitz | 364/200 |
| 4,631,534 | 12/1986 | Franklin et al. | 340/825.51 |

FOREIGN PATENT DOCUMENTS

| | | | |
|---|---|---|---|
| 57-24147 | 2/1982 | Japan | 375/2.1 |
| 58-62745 | 4/1983 | Japan | 375/2.1 |
| 0097621 | 6/1982 | Switzerland | 375/2.1 |

OTHER PUBLICATIONS

"Physical Signaling, Medium Attachment, and Baseband Medium Specifications, Type 1BASE5: StarLAN", IEEE Computer Society, Draft C, Oct. 1985.

*Primary Examiner*—Stephen C. Buczinski
*Assistant Examiner*—Bernarr Earl Gregory
*Attorney, Agent, or Firm*—Ross T. Watland

[57] ABSTRACT

An arrangement for securing data transmissions to and from one data device from among a plurality of data devices sharing a common interface is disclosed. In a data communication network, a master communication bus connects to a plurality of data transmitting and receiving devices via a single interface. The disclosed arrangement provides circuitry in the common interface which generates a jamming signal to all devices connected to the interface except for that one device which is either transmitting or receiving a data-transmission. The jamming signal inhibits all the connected devices from monitoring and detecting the data transmission processes of the interface. The one transmitting and receiving device is enabled to either transmit or receive data during the generation of the jamming signal which ensures a secure data transmission and prevents "eavesdropping" by the other devices. The jamming signal is removed at the conclusion of the data transmission to or from the one device.

34 Claims, 4 Drawing Sheets

DATA TRANSMISSION SECURITY ARRANGEMENT FOR A PLURALITY OF DATA STATIONS SHARING ACCESS TO A COMMUNICATION NETWORK

TECHNICAL FIELD

This invention relates to data communication networks and, in particular, to a security arrangement for maintaining secure data transmissions between a plurality of data transmitting and receiving devices sharing common transmission and reception facilities.

BACKGROUND OF THE INVENTION

Data communication networks for exchanging data transmissions between two or more data transmitting and receiving devices were popularized with the advent of electronic computers and the development of digital signal processing techniques. A typical data communication network arrangement interconnects a plurality of data transmitting and receiving devices to a data network via associated interfaces. The data communication network typically comprises a bidirectional bus which provides the medium for data transmission among the data transmitting and receiving devices. It is known to use packet-type data transmissions for the above-described communication network. The devices connected to the bus may comprise a variety of data transmitting and receiving equipment such as large scale computers, personal computers, intelligent and non-intelligent terminals or digital station sets. Each device connects to the network via an interface. The interface processes incoming and outgoing packet data transmissions to and from the devices. The processing operations include such processes as determining the origin and destination of the data packet, controlling access to and from the bus, and formatting and unformatting the data packets. Typically, a device, such as a terminal, is connected to a single interface which performs the processing operations associated with the receipt and transmission of data. However, an arrangement that utilizes a single interface for an associated data transmitting and receiving device is costly and inefficient. Therefore, arrangements were developed that utilize a single interface to perform processing operations for a plurality of associated data transmitting and receiving devices.

A shared interface arrangement is typically found in small business offices where economies are important. For example, a number of non-intelligent terminals located at each employee's desk are connected through a single interface to a bi-directional data packet bus. The bus is connected to a host computer via an associated interface. This arrangement provides all the employees having a terminal to access the host computer via the single interface. Therefore, all data transmissions to and from each terminal are processed by the single interface. The shared processing operations allow any of the terminal users to intercept any incoming or outgoing data transmissions merely by monitoring the current processing operations of the interface, and detecting the receipt or transmission of data.

Although a shared interface provides economies, an overwhelming disadvantage of the shared interface arrangement is that any data transmission, either received or transmitted, may be intercepted by any of the plurality of devices connected to the interface. Any device user may "eavesdrop" on a data transmission despite the fact that the user's device is not the originating device or destination device of the data transmission. The above-described arrangement, therefore, precludes the transmission and receipt of data having a proprietary nature to and from the network since each device is incapable of receiving or transmitting a secure data transmission. Heretofore, no arrangement exists which provides for secure data transmissions to and from a single data device where the single device shares a common interface to a network with a plurality of other data devices.

SUMMARY OF THE INVENTION

An arrangement for securing data transmissions to and from one data device from among a plurality of data devices sharing a common interface is disclosed. The disclosed arrangement provides circuitry in the common interface which generates a jamming signal to all devices connected to the interface except for that one device which is either transmitting or receiving a data transmission. The jamming signal inhibits all the connected devices from monitoring and detecting the data transmission processes of the interface. The one transmitting or receiving device is enabled to either transmit or receive data during the generation of the jamming signal. The jamming signal ensures a secure data transmission and prevents "eavesdropping" by the other devices. The jamming signal is removed at the conclusion of the data transmission to or from the one device.

The disclosed arrangement is utilized where a plurality of data transmitting and receiving devices share a single interface to a master communication bus. The interface comprises a data processor for processing incoming and outgoing data transmissions, a selective routing and transmission controller for generating a jamming signal and a transmit/receive regulator associated with each device for discriminately inhibiting or enabling, as appropriate, a data transmission to or from associated data devices. Assume for this portion of the description that an incoming data transmission from the network to one of the plurality of devices occurs. The data processor of the interface, in response to the receipt of the incoming data packet, generates a ready to transmit (RTT) signal indicative of the receipt of a data transmission and applies the RTT signal to the selective routing and transmission controller. The data processor, concurrently, determines the destination of the data packet and generates routing data indicative of the specified destination device. The data processor applies the routing data to the selective routing and transmission controller. The selective routing and transmission controller, in response to the RTT signal, generates and applies a jamming signal to all transmit/receive regulators having associated devices. Concurrently, the selective routing and transmission controller, in response to the receipt of the routing data, generates and applies a secure data signal to the all transmit/receive regulators associated with the non-destination devices. The secure data signal enables the jamming signal to extend through those regulators to all data devices. The application of the jamming signal inhibits any device from accessing the interface to detect the presence of a data transmission. The absence of a secure data signal at the transmit/receive regulator associated with the destination device negates the application of the jamming signal to the transmit/receive regulator. The absence of the secure data signal enables the transmit/receive regulator of the associated specified destination device to receive an unencumbered data transmission, and apply this data transmission to the destination device. In the above described manner, incoming data transmissions from the network to a destination device are secured so as to prevent "eavesdropping" by the remaining devices of the interface.

Assume now for the next portion of this description that a device generates an outgoing data transmission to the network. The generated data transmission is applied to the originating device's associated transmit/receive regulator. In the outgoing transmission direction, the transmit/receive regulator, in response to the detected data transmission, generates an activity signal indicating that the associated device is actively transmitting data. The activity signal identifies that device as the device actively transmitting outgoing data from among the group of devices. The activity signal in the outgoing data transmission direction provides the same function as the absent secure data signal in the incoming data transmission direction. In particular, the transmit/receive regulator associated with the originating device applies the outgoing data and the activity signal to the selective routing and transmission controller. The selective routing and transmission controller, in response to the receipt of the activity signal, generates a jamming signal. The selective routing and transmission controller applies the jamming signal to all transmit/receive regulators having associated devices in much the same manner previously described with respect to the RTT signal associated with incoming data. The presence of the activity signal at the transmit/receive regulator associated with the originating device negates the application of the jamming signal to the originating device, and allows the outgoing data transmission to be applied through the interface unencumbered. The processor, in response to the received outgoing data, processes the data transmission. However, the absence of the activity signal at the transmit/receive regulators associated with the non-originating devices inhibit the non-originating devices from monitoring for data transmissions. The transmit/receive regulators of the associated non-originating devices extend the jamming signal to all non-originating devices. In the above-described manner, outgoing data transmissions are secured so as to prevent "eavesdropping" by the non-originating devices.

Following the conclusion of the data transmission, either outgoing or incoming, the selective routing and transmission controller removes the jamming signal from all the devices.

The disclosed circuitry for maintaining secure transmissions among a plurality of devices sharing a common interface is economically advantageous and requires a minimum amount of hardware. The inclusion of the disclosed circuitry maintains the economy of utilizing a common interface, and still allows for the transmission and receipt of proprietary data.

BRIEF DESCRIPTION OF THE DRAWINGS

The invention may be better understood by a reading of the following detailed description of one possible exemplary embodiment thereof taken in conjunction with the accompanying drawings wherein.

DETAILED DESCRIPTION

Figure 1:
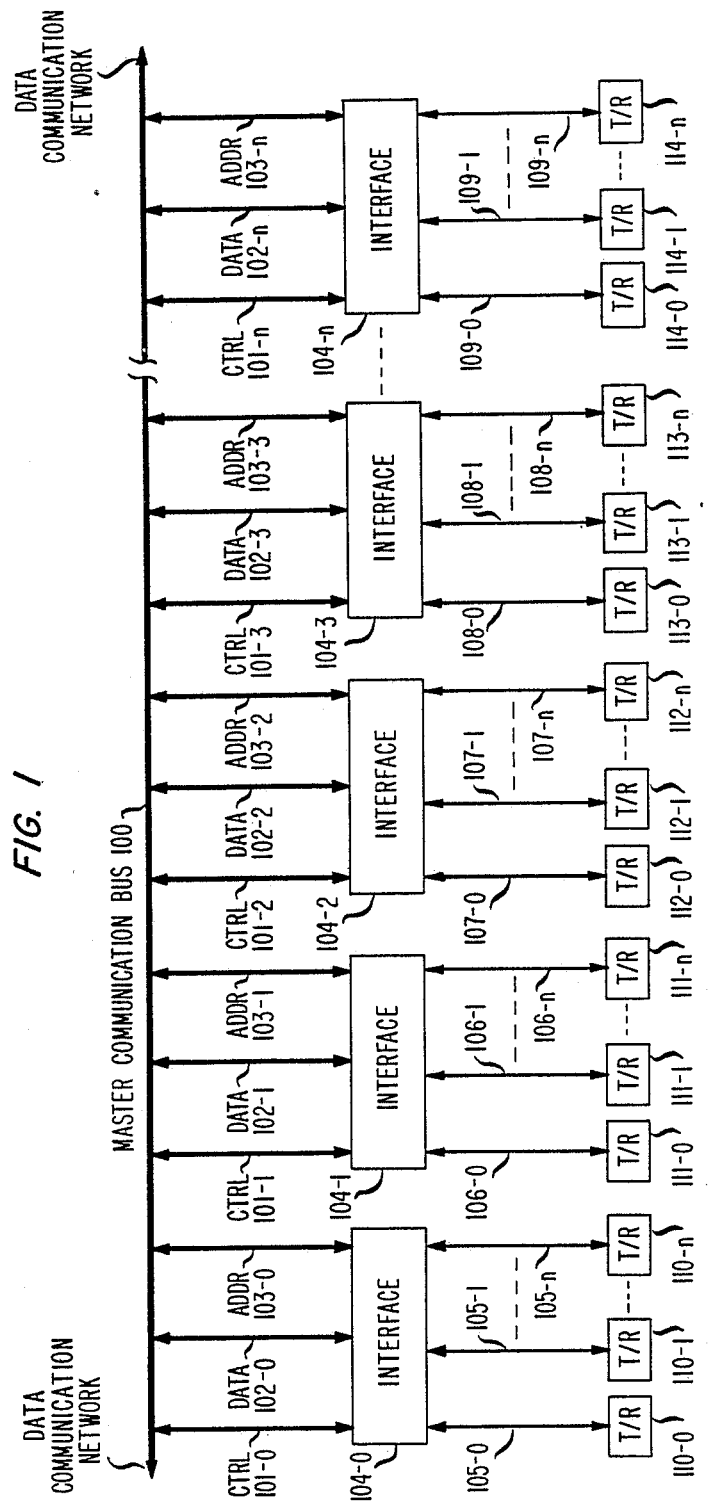
FIG. 1 illustrates a typical data communication network.

FIG. 1 illustrates a typical architectural structure of a data communication network. The network comprises a bidirectional master communication bus 100, a plurality of transmitting and receiving (T/R) devices 110-0 through 110-n, 111-0 through 111-n, 112-0 through 112-n, 113-0 through 113-n and 114-0 through 114-n, and a plurality of interfaces 104-0 through 104-n. Assume for the remainder of this description that the data network serves to exchange data packets of information among the plurality of transmitting and receiving devices. Data packet transmission is known to the art and therefore, no further details are provided.

Each data packet includes control information which controls the data transmission, data information which comprises the actual data message, and address information which identifies the origin and destination of the data packet. The entire data packet is typically applied to and from the interface of a destination transmitting or receiving device or an origination transmitting or receiving device over a common bidirectional bus which extends from the master communication bus to the interface. However, for ease of description, each type of information has an associated bidirectional bus such that control data is applied over control buses 101-0 through 101-n, message data is applied over data buses 102-0 through 102-n, and address data is applied over 103-0 through 103-n. The control, data and address buses interconnect master communication bus 100 to interfaces 104-0 through 104-n.

Interfaces 104-0 through 104-n process incoming and outgoing data packets. The processes include formatting and unformatting data packets, determining the originating and destination transmitting and receiving devices, routing data packets to and from the originating and destination transmitting and receiving devices, extending data message to and from the originating and destination transmitting and receiving devices and controlling access to and from master communication bus 100. The details of the illustrated interfaces of FIG. 1 are discussed subsequently.

Each interface 104-0 through 104-n performs common processing operations for a plurality of associated connected transmitting and receiving devices. Transmitting and Receiving (T/R) 110-0 through 110-n, 111-0 through 111-n, 112-0 through 112-n, 113-0 through 113-n and 114-0 through 114-n are connected to associated interfaces 104-0 through 104-n over bidirectional paths 105-0 through 105-n, 106-0 through 106-n, 107-1 through 107-n, 108-0 through 108-n and 109-0 through 109-n, respectively. Data transmissions are received from and transmitted to interfaces 104-0 through 104-n over these bidirectional paths. The transmitting and receiving (T/R) devices of FIG. 1 may be any type data generating devices such as personal computers (PCs), intelligent or non-intelligent terminals, host computers or digital station sets. For ease of description, the transmitting and receiving (T/R) devices of FIG. 1 are referred to as T/R devices. The data communication network of FIG. 1 serves to exchange data between one or more of the T/R devices via an associated interface. Interface Device 104-0

Figure 2:
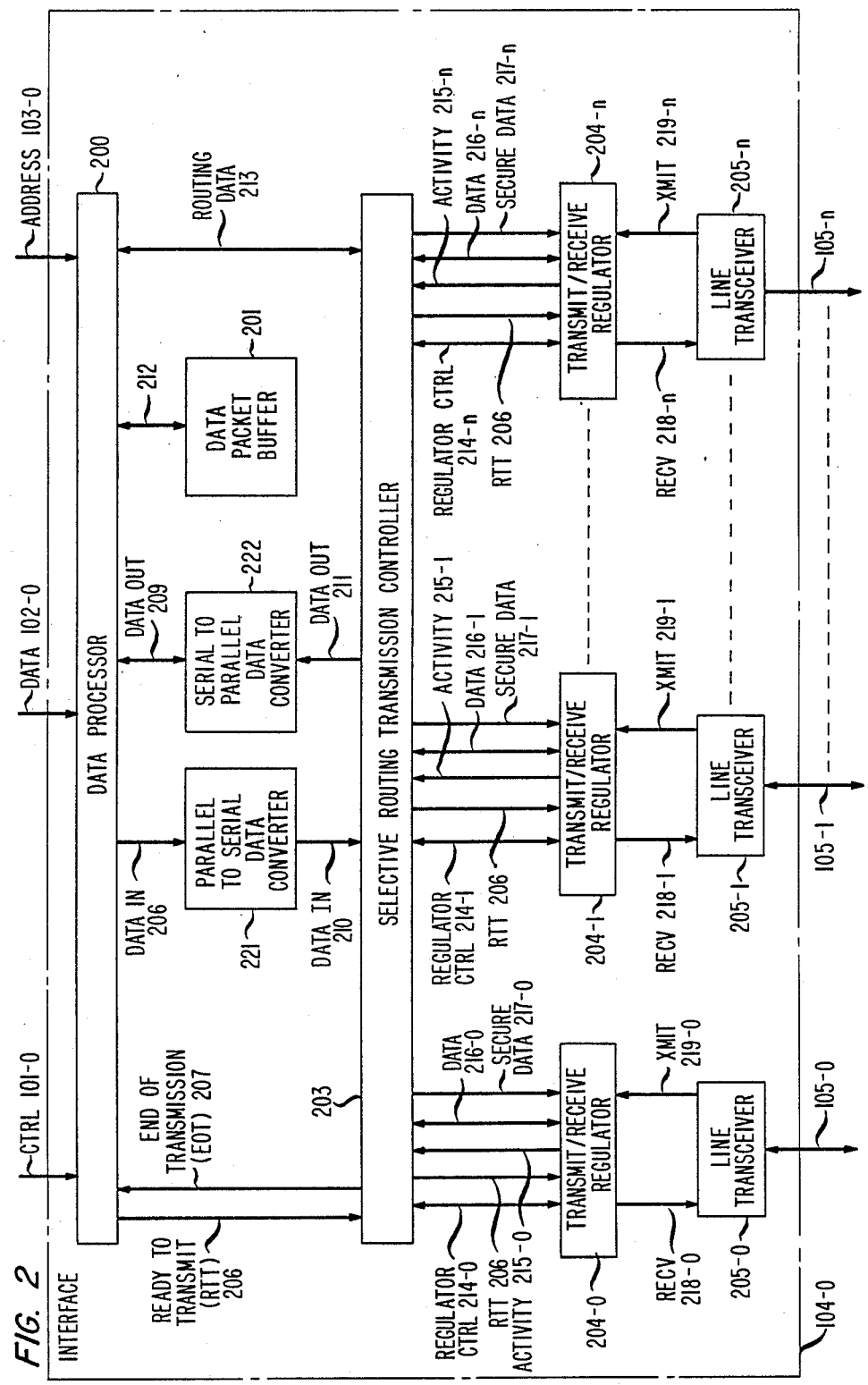
FIG. 2 illustrates the details of an interface which connects a plurality of data transmitting and receiving devices to the communication network as shown on FIG. 1.

FIG. 2 illustrates the details of one interface such as interface 104-0 of FIG. 1. Interface 104-0 processes incoming and outgoing data transmissions for a plurality of associated T/R devices 110-0 through 110-n as received from or transmitted to master communication bus 100. Interface 104-0 comprises data processor 200, parallel to serial and serial to parallel to data converters 221 and 222, respectively, data packet buffer 201, selective routing and transmission controller 203, transmit/receive regulators 204-0 through 204-n and line transceivers 205-0 through 205-n. Data processor 200 scans master communication bus 100 for data packets over buses 101-0, 102-0 and 103-0, controls access to and from master communication bus 100 over buses 101-0, 102-0 and 103-0, formats and unformats outgoing and incoming data packets of information, identifies the origin and destination of the outgoing and incoming data transmissions, and determines the start of and termination of incoming and outgoing data transmissions. Processor 200 connects to data packet buffer 201 over bidirectional path 212. Buffer 201 stores a plurality of data packets to await data processing by processor 201 prior to accessing master communication bus 100. Buffer 201 also stores a plurality incoming data packets to await data processing by processor 200 prior to extending transmission to the destination T/R device. The process of accessing the network and exchanging data between two T/R devices is not described since this process comprises no part of the disclosed invention is well known to the art.

Processor 200 connects to selective routing and transmission controller 203 over paths 206, 207 and 213 and, indirectly, over paths 210 and 211 via converters 221 and 222, respectively. Converter 221 connects to processor 200 over path 208 and performs parallel to serial data conversion on incoming data transmission; and converter 222 connects to processor 200 over path 209 and performs serial to parallel data conversion on outgoing data transmissions. Converters of the above-described type are known to the art and are, therefore, not described in further detail. Converters 221 and 222 connect over paths 210 and 211 to controller 203. Transmit/Receive Regulator Services Controller 203 and regulators 204-0 through 204-n comprise the disclosed subject invention for providing secure data transmission to and from a single T/R device where a plurality of T/R devices are served by a common interface. The disclosed controller 203 and regulators 204-0 through 204-n prevent the non-transmitting and non-receiving T/R devices 110-0 through 110-n from "eavesdropping" on a data transmission. Controller 203 identifies the originating or the destination T/R device 110-0 through 110-n associated with the data transmission, detects the start and the termination of a data transmission to and from associated T/R devices 110-0 through 110-n, detects actively transmitting T/R devices 110-0 through 110-n, generates and applies a secure data signal to the all non-transmitting and non-receiving T/R devices 110-0 through 110-n and generates and applies a control signal to all T/R devices 110-0 through 110-n. The combination of the secure data signal and control signal ensures the proprietary transmission of information to the transmitting or receiving T/R device and prevents the non-transmitting and non-receiving T/R devices from "eavesdropping" on the incoming or outgoing data transmission. The details of controller 203 and the generated signals are described subsequently. Controller 203 connects over paths 206, 214-0 through 214-n, 215-0 through 215-n, 216-0 through 216-n, 217-0 through 217-n to transmit/receive regulators 204-0 through 204-n where each transmit/receive regulator is associated with a T/R device. Transmit/receive regulators 204-0 through 204-n comprise the logic to regulate the transmission of data to and from the associated T/R devices 110-0 through 110-n. Regulators 204-0 through 204-n inhibit the non-originating or non-receiving T/R devices from detecting a data transmission, and the regulator associated with the originating or receiving T/R device enables the T/R device to transmit or receive a data transmission. Further details of transmit/receive regulators 204-0 through 204-n are discussed subsequently.

Each transmit/receive regulator 204-0 through 204-n connects to an associated line transceiver 205-0 through 205-n over paths 218-0 through 218-n and 219-0 through 219-n, respectively. Line transceivers 205-0 through 205-n serve to drive incoming and outgoing data along the appropriate data transmission path to either an associated destination station or to the associated regulator. Line transceivers are known to the art and therefore, no further detail is provided. Incoming Data Transmission The above description identifies each element of the interface and describes, in general, the purpose of each element within the interface. The following description describes the functions and operations of the elements with respect to an incoming data transmission from the data communication network illustrated on FIG. 1.

Assume that a data packet of information is applied to interface 104-0 over control 101-0, data 102-0 and address 103-0 buses from master communication bus 100. Assume, also, that the destination of the data packet is T/R device 110-0 which connects to interface 104-0 over path 105-0. Assume, further, that no other data transmissions are currently occurring. In response to the receipt of the data packet of information, processor 200 concurrently generates the following information to controller 203 following the unformatting of the data packet of information. Processor 200 applies a ready to transmit (RTT) signal to controller 203 over path 206. The RTT signal indicates that a data transmission is received and is being immediately transmitted to one of the T/R devices. Processor 200 applies the incoming data over path 208 to converter 221 which converts the parallel data to a serial data stream. Converter 221 applies the serial data over path 210 to controller 203. Processor 200 applies routing data which identifies the destination T/R device, 110-0, to controller 203 over path 213. Controller 203 responds to the concurrent receipt of the RTT signal on path 206, data on path 210 and destination information on path 213 to generate, concurrently, the following signals. The circuit details of controller 203 are discussed subsequently.

Controller 203 extends the RTT signal over path 206 to each transmit/receive regulator 204-0 through 204-n. Controller 203, in response to the received routing data identifying the destination T/R device, 110-0, generates and applies a secure data signal to regulators 204-1 through 204-n having associated T/R devices 110-1 through 110-n over path 217-1 through 217-n. These regulators are associated with the non-destination T/R devices 110-1 through 110-n. Regulators 204-1 through 204-n having associated T/R devices 110-1 through 110-n receive a secure data signal since T/R devices 110-1 through 110-n are not the destination T/R devices. Controller 203 also generates a regulator control signal in response to the receipt of the RTT signal. Controller 203 applies the regulator control signal to regulators 204-0 through 204-n over paths 214-0 through 214-n. Controller 203 extends the incoming data transmission to regulators 204-0 through 204-n over paths 216-0 through 216-n. Regulators 204-1 through 204-n receive an RTT signal on path 206, a regulator control signal on paths 214-1 through 214-n, data on paths 216-1 through 216-n and a secure data signal on paths 217-1 through 217-n. The combination of the receipt of these identified signals inhibits the application of the data received on paths 216-1 through 216-n to line transceivers 205-1 through 205-n. However, the regulator is enabled to apply the regulator control signal on paths 214-1 through 214-n to transceivers 205-1 through 205-n over paths 218-1 through 218-n. Transceivers 205-1 through 205-n apply the regulator control signal to devices 110-1 through 110-n over paths 105-1 through 105-n. The regulator control signal jams each T/R device 110-1 through 110-n, and prevents T/R devices 110-1 through 110-n from intercepting the incoming data transmission. This prevents the nondestination stations from "eavesdropping" on the transmission.

Alternately, regulator 204-0 receives an RTT signal on path 206, a regulator control signal on path 214-0, data on path 216-0 and no secure data signal on path 217-0. The absence of a secure data signal negates the application of the above-described regulator control signal to line transceiver 205-0 and therefore, the associated T/R device, 110-0, is not jammed. The combination of these identified signals with the absence of the secure data signal inhibits the application of the regulator control signal on path 214-0 and enables regulator 204-0 to extend the data received on path 216-0 over path 218-0 to line transceiver 205-0. In response to the received data on path 218-0, line transceiver 205-0 drives the incoming data over path 105-0 to the destination T/R device, 110-0.

In the above-described manner, only the identified destination T/R device receives the incoming data transmission. All non-destination T/R devices receive a regulator control signal which jams the direct transmission path of the T/R devices so that no monitoring can occur during the receipt of a data transmission. This prevents the non-destination T/R devices from "eavesdropping" on the data transmission. Incoming data transmissions to one of the T/R devices served by a common interface remain secure since only the destination T/R device receives the data, and all remaining T/R devices receive a control signal to jam the non-destination devices.

Controller 203 removes the regulator control signal on paths 214-0 through 214-n and the secure data signal on paths 217-1 through 217-n when the RTT signal ceases. The cessation of the RTT signal indicates that the data transmission is terminated. Additionally, no data is currently present on paths 216-0 through 216-n. Following the removal of the regulator control signal, the secure data signal, the RTT signal and the lack of data, regulators 204-1 through 204-n are enabled to receive an incoming data transmission from the network. In response to the removal of the RTT signal on path 206, regulator control signal on path 214-0 and lack of data on 216-0, regulator 204-0 is no longer secured since the data transmission has been completed to the identified destination station. Regulator 204-0 exists in the same enable status as regulators 204-1 through 204-n which has been previously described.

Outgoing Data Transmission

The above discussion described the operation of interface 104-0 with respect to the receipt of an incoming data transmission from the data communication network to a destination T/R device, 110-0, of interface 104-0. The following describes an outgoing data transmission as generated from one of the T/R devices of interface 104-0. Assume that the T/R device originating the data transmission is T/R device 110-0. Assume further that T/R devices 110-1 through 110-n are not currently transmitting. T/r device 110-0 applies data to line transceiver 205-0 over lead 105-0. Line transceiver 205-0 applies the outgoing data to regulator 204-0 over XMIT path 219-0. Regulator 204-0 applies the outgoing data to controller 203 over path 216-0. Regulator 204-0, concurrently, in response to the received data transmission, generates an activity signal. The activity signal indicates that T/R device 110-0 is currently transmitting data. The activity signal identifies device 110-0 as that T/R device actively transmitting outgoing data from among the group of T/R devices 110-0 through 110-n. The activity signal in the outgoing data transmission direction provides the same function as the absent secure data signal in the incoming data transmission direction. In particular, regulator 204-0 applies an activity signal to selective routing and transmission controller 203 over path 215-0. The activity signal indicates that a T/R device is actively transmitting data. The initial presence of the activity signal also indicates the start of a data transmission. The activity signal as transmitted to controller 203 is similar to the RTT signal previously described. Controller 203, in response to the receipt of the activity signal on path 215-0 and data on path 216-0, concurrently, executes the following operations to secure the outgoing data transmission.

Controller 203, in response to the receipt of the activity signal on path 215-0, generates a regulator control signal and applies this signal to all regulators 204-0 through 204-n over paths 214-0 through 214-n. Regulators 204-1 through 204-n, response to the regulator control signal in the following manner. Regulators 204-1 through 204-n are associated with non-originating data transmission T/R devices 110-1 through 110-n and since these devices are not actively transmitting, no activity signal is present in regulators 204-1 through 204-n. Regulators 204-1 through 204-n can, therefore, extend the regulator control signal on paths 214-1 through 214-n to T/R devices 110-1 through 110-n to jam the T/R devices so as to prevent monitoring for data transmissions in the manner previously described. However, as previously described, an activity signal is present in regulator 204-0. The activity identifies T/R device 110-0 as the originating T/R device. The presence of an activity signal negates the application of the regulator control signal on path 214-0 such that T/R device 110-0 is not jammed and the data transmission can be extended to the network. In particular, controller 203 extends the received generated data transmission on path 216-0 to converter 222 over path 211. Converter 222 converts the received serial data stream to a parallel data configuration, and applies the parallel data to processor 200 over path 209. Processor 200 processes the data, as previously described. Controller 203, also, "echoes back" the received data transmission to the T/R device, 110-0, originating the transmission. This "echo back" function is part of an error checking operation to confirm the accuracy of the data transmission. The error checking function comprises no part of the disclosed invention and therefore, no further detail is provided since such functions are well known to the art. The echoed data, as well as the transmitted data are secured from the nonoriginating T/R devices 110-1 through 110-n. No jammed T/R device 110-1 through 110-0 can intercept the "echo back" data or "eavesdrop" on the data transmission. Therefore, T/R device 110-0 maintains a secure data transmission.

As previously described, during a data transmission all non-originating T/R devices are jammed, and only the originating T/R device may generate a data transmission and receive "echo-back" data. The regulator control signal prevents the non-originating T/R devices from "eavesdropping" on the data transmission. In the above-described manner, the data transmission from a single T/R device remains secure from the remaining T/R devices.

The data transmission remains secure during the entire data transmission. When the data transmission is terminated, the activity signal ceases transmission is terminated, the activity signal ceases transmission to controller 203 over path 215-0. Obviously, no data appears on data path 216-0. Controller 203, in response to this cessation of the data transmission and the activity signal, applies an end of transmission (EOT) signal to processor 200 over path 207 to indicate that no further data is being transmitted. Concurrently, controller 203, in response to the cessation of data and the activity signal, removes the regulator control signal from paths 214-0 through 214-n. Regulators 204-0 through 204-n are now enabled to transmit and receive data transmissions from associated T/R devices 110-0 through 110-n.

Multiple Concurrent Data Transmissions

Assume, now, that more than one or multiple T/R devices of interface 104-0 are concurrently, transmitting data to master communication bus 100. As previously described, a transmit/receive regulator generates an activity signal whenever a T/R device is actively transmitting data. Therefore, in response to multiple data transmissions from a number of T/R devices, more than one activity signal is applied from regulators 204-0 through 204-n to controller 203 over paths 215-0 through 215-n. In response to the presence of more than one activity signal at one time, controller 203 generates a regulator control signal indicative of the multiple data transmission activity to regulators 204-0 through 204-n over paths 214-0 through 214-n. Data transmissions are no longer secure if more than one station is transmitting since, as previously described, specified signals serve to enable the regulators to pass through data. Therefore, each regulator having an associated originating device could intercept outgoing transmissions from other originating devices since all paths remain open because no originating T/R device is jammed. Regulators 204-0 through 204-n, in response to multiple transmission activity, extend the regulator control signal over paths 218-0 through 218-n via line transceivers 205-0 through 205-n to T/R devices 110-0 through 110-n over paths 105-0 through 105-n. All T/R devices 110-0 through 110-n are now jammed and prevented from transmitting data. The regulator control signal remains active until all activity ceases or a single activity signal is present as detected by controller 203. In response to a single activity signal, a secure data transmission can take place in the manner described above. Therefore, only a single T/R device of an interface may transmit a secure data transmission at one time. Multiple data transmission attempts are blocked since secure data transmissions cannot occur. The details of this operation are discussed subsequently.

The above discussion describes at the block diagram level, how the shared interface serving a plurality of T/R devices can transmit and receive secure data transmissions. During the receipt of transmission of data to or from one of the T/R devices, the remaining T/R devices are prevented from "eavesdropping" on the data transmission by receiving a regulator control signal on their associated data transmission paths. This regulator control signal jams the remaining T/R devices and prevents these remaining T/R devices from monitoring for data transmissions. The regulator control signal is removed from the data transmission path associated with each non-originating or non-destination T/R device when the data transmission is terminated. In the above-described manner, secure data transmissions occur. The following description describes the circuit details of controller 203 and regulator 204-0, respectively.

Figure 3:
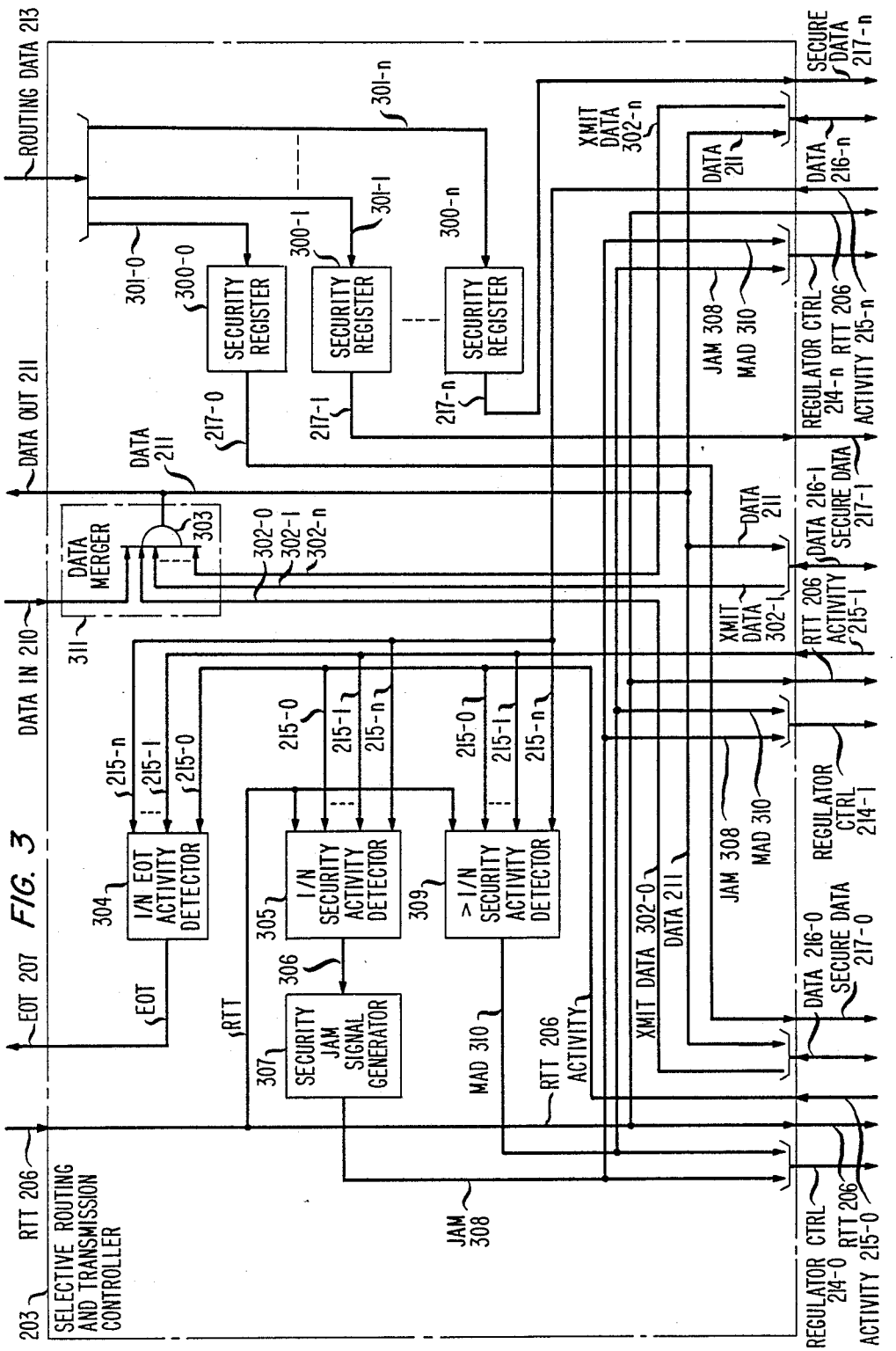
FIG. 3 illustrates further details of the interface of FIG. 2.

FIG. 3 illustrates the circuit details of selective routing and transmission controller 203 of interface 104-0 of FIG. 2. Controller 203 comprises security registers 300-0 through 300-n, data merger 311, 1/N security activity detector 305, >1/N security activity detector 309, 1/N EOT activity detector 304, and security jam signal generator 307.

The details of controller 203 are first discussed with respect to an incoming data packet for T/R device 110-0. No other data transmissions are presently occurring. Assume processor 200 has processed the data packet as previously described above with respect to an incoming data packet. In response to the receipt of the data packet, processor 200 generates and applies a RTT signal to controller 203 over path 206, applies the data from the received packet to controller 203 over path 210 and applies the identity of the destination, 110-0, as routing data to controller 203 over path 213. As previously described, the RTT signal on path 206 is extended to all regulators 204-0 through 204-n to indicate that a packet has been received and a data transmission is presently occurring to a destination T/R device, i.e. 110-0.

The routing data as applied over path 213 to controller 203, as previously described, includes information as to the identity of the destination T/R device, i.e. 110-0. Each T/R device 110-0 through 110-n is associated with a security register 300-0 through 300-n, for example: T/R device 110-0 is associated with security register 300-0, T/R device 110-1 is associated with security register 300-1, T/R device 110-n is associated with security register 300-n and so forth. The security registers may be flip-flops which change state in response to input signals applied to the registers. The routing data as shown comprises several paths to which appropriate routing data may be applied wherein each path is associated with a specified T/R device. Routing data associated with the destination T/R device 110-0 is applied to the associated destination security register 300-0 over the associated destination path 301-0. Sincde the incoming data is to extend through to destination T/R device 110-0, register 300-0 does not change state and an inactive signal, a low, is applied over 217-0. An inactive signal indicates that the associated regulator 204-0 of the destination T/R device, 110-0, does not receive a secure data signal. However, the security registers 300-1 through 300-n are not associated with the destination T/R device and, therefore, no data is extended to T/R devices 110-1 through 110-n. The routing data applied to non-destination paths 301-0 through 301-n to non-destination security register 300-1 through 300-n activates the security registers. Security registers 301-0 through 301-n change states and an active, a high, secure data signal is generated over paths 217-1 through 217-n.

The RTT signal, as previously described, extends through controller 203. The RTT signal on path 206 is additionally applied to detectors 305 and 309, respectively. Detector 305 is 1/N detector which detects either no data transmission activity or the activity of at least one data transmission such as with the occurrence of an incoming data transmission from the data communication network of FIG. 1. Detector 309 is a >1/N detector which detects when multiple data transmissions are, concurrently, occurring. Assume that only a single incoming data transmission is presently occurring, and that no station is presently attempting to transmit data so that no activity signals are present. Under these conditions, the only active input to detectors 305 and 309 is the RTT signal on path 206. Since detector 309 is only activated in response to multiple data transmission activity, the RTT signal does not activate detector 309. Detector 309 maintains a low output indicative of no multiple data transmission activity over path 310. The signal on path 310 comprises part of the regulator control signal which is applied to all regulators 204-0 through 204-n over paths 214-0 through 214-n. Detector 305, however, is activated in response to the RTT signal since that signal is the only active incoming signal to indicate a data transmission. In response to the RTT signal on path 206, detector 305 changes from a low to a high state and applies a high signal to security jam signal generator 307 over path 306. Security jam signal generator 307 is activated in response to the signal received on path 306.

Generator 307, in response to activation, generates a jam signal. The jam signal may conform to IEEE specifications defining CSMA/CD standard signaling. An example is specified by the IEEE 802.3 task force in IEEE, Draft C of Oct. 1985 entitled Physical Signaling, Medium Attachment and Baseband Medium Specifications, Type 1BASE5. Generator 307 applies the jam signal over path 308 to regulators 204-0 through 204-n over regulator control paths 214-0 through 214-n. The generated jam signal on paths 214-0 through 214-n in combination with the secure data signal on paths 217-1 through 217-n enables the application of the jamming signal to the non-destination T/R devices 110-1 through 110-n via regulators 204-1 through 204-n, and allows a secure data transmission to T/R device 110-0 via regulator 204-0 to occur. In particular, the incoming data is applied to data merger 311 over path 210 where the data is enabled through AND gate 303. Data merger 311 extends the incoming data over common data transmission path 211. Since common data transmission path 211 exists, the incoming data is applied over data paths 216-0 through 216-n to regulators 204-0 through 204-n. As previously described, even though the received data is transmitted to all regulators, the combination of the secure data signal on paths 217-1 through 217-n and the jam signal on paths 214-1 through 214-n prevents the data from being applied to the non-destination T/R devices 110-1 through 110-n from associated regulators 204-1 through 204-n. The details of the regulators are discussed subsequently.

Assume, now, that a T/R device is transmitting data at the same time as an incoming data packet is received by processor 200. As previously described, detector 309 detects multiple data transmission activity. Therefore, in response to the detection of multiple data transmission activity as indicated by the reception of an RTT signal on path 206 and the reception of an activity signal from any one of the T/R devices 110-0 through 110-n which is transmitting data as received over paths 215-0 through 215, detectors 305 and 309 are activated. In response to the detection of multiple data transmission, activity activated detector 305 changes from a low to a high state since at least one data transmission exists and generates a high signal. Detector 305 applies the high signal to generator 307 over path 306. Generator 307 is activated in response to the high signal received on path 306. Jam signal generator 307 applies a jam signal over path 308 to regulator control paths 214-0 through 214-n. Detector 309, in response to multiple activity detection indicated by the receipt of the RTT signal on path 206 and at least one activity signal on any path 215-0 through 215-n, generates a multiple activity detected (MAD) signal, a high, onto path 310. Detector 309 applies the MAD signal on path 310 to regulators 204-0 through 204-n over the regulator control paths 214-0 through 214-n. The combination of the jam signal on path 308 and the MAD signal on path 310 as applied over regulator control paths 214-0 through 214-n prevents the transmission of any data to any T/R device. All T/R devices remain jammed until all data transmission activity ceases or a single data transmission is present. The secure data signal is overridden by the combination of the jam and MAD signals when multiple transmission activity is detected.

The above discussion describes the operation of the elements of controller 203 when an incoming data transmission is received. The following describes the function of controller 203 with respect to an outgoing data transmission from a T/R device such as T/R device 110-0. As previously described, data generated from the transmitting T/R device 110-0 is received by controller 203 over data path 216-0 which additionally comprises XMIT path 302-0. The incoming data is applied to data merger 311 over XMIT data path 302-0. Data merger 311 applies the data through multi-input AND gate 303 of data merger 311. Data merger 311 applies the transmitted data to processor 200 over data out 211. As previously discussed, the transmitted outgoing data is "echoed back" to determine the accuracy of the data transmission. Data merger 311 applies "echo-back" data over common data path 211 to all regulators 204-0 through 204-n over bidirectional data paths 216-0 through 216-n. The "echo-back" data requires security measures to ensure a proprietary data transmission.

In addition to transmitting data, the T/R device, i.e. 110-0, as previously described, generates an activity signal indicative of a current data transmission on path 215-0. The presence of an activity signal at regulator 204-0 allows throughput of the "echo-data" to T/R device 110-0. In addition, regulator 204-0 applies the activity signal to detectors 305 and 309 on path 215-0. Detectors 305 and 309 respond in the manner previously described with respect to the receipt of the RTT signal. Generator 307 generates and applies a jam signal over path 308 to regulator control paths 214-0 through 214-n. If more than one data transmission activity is detected concurrently, detectors 305 and 309 generate a jam signal and a MAD signal, as previously described, and apply these signals over paths 308 and 310, respectively, in the same manner previously described.

The activity signal is additionally applied to 1/N EOT activity detector 304 over path 215-0. EOT detector 304 is inhibited in response to the application of the activity signal and, therefore, does not generate any signal. The absence of an EOT signal indicates that there is current data transmission activity. However when no activity signal is applied to detector 304 which indicates that there is no current data transmission activity, detector 304 generates and applies an EOT signal to processor 200 over path 207. Processor 200, in response to the receipt of the EOT signal on path 207, detects the termination of a data transmission. In the above described manner, controller 203 secures data transmissions between the T/R devices of the common interface.

Figure 4:
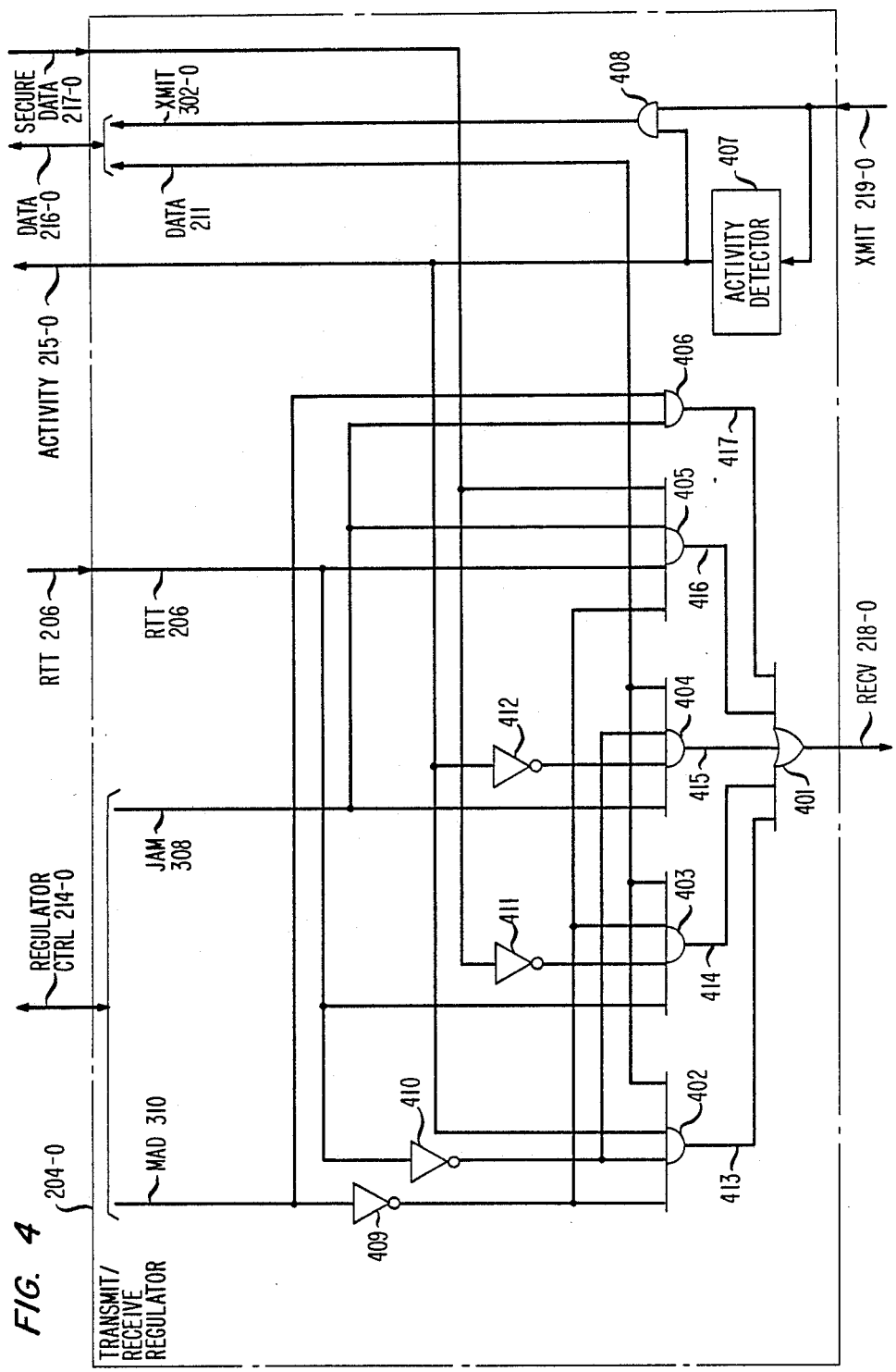
FIG. 4 illustrates further details of the interface of FIG. 2.

FIG. 4 illustrates the circuit details of regulator 204-0 which is connected to T/R device 110-0 via transceiver 205-0. Assume that a data transmission is received for T/R device 110-0 and the received data transmission is the only current on-going data transmission. Since T/R device 110-0 is currently inactive, no data signal is detected over XMIT path 219-0 and therefore, activity detector 407 remains inactive. Activity detector 407 responds to a change in voltage on XMIT 219-0 such that a signal on path 219-0 must exceed a specified threshold value in order for activity detector 407 to become active. In the current case, a low signal exists on paths 219-0. A low signal is applied over path 219-0 to activity detector 407 and AND gate 408. This low signal indicates no data transmission activity is occurring at the associated T/R device 110-0. Detector 407 remains inactive and generates a low signal over path 215-0 to controller 203 and AND gate 408. In response to the low signals on paths 215-0 and 219-0, AND gate 408 applies a low over XMIT path 302-0 indicating a clear data transmission path. As previously described, the associated regulator 204-0 of the destination T/R device, i.e. 110-0, receives a low signal over path 217-0 which indicates that no secure data signal is present. The absence of a secure data signal indicates that the data transmission may extend through regulator 204-0 over data path 211. Additionally, since no multiple data transmission activity is detected because only a single data transmission exists, the MAD signal on path 310 is low. As previously described, all regulators receive an active jam signal whenever a data transmission occurs and therefore, the jam signal exists on path 308. Also, as previously indicated, the RTT signal is high which indicates a receipt of the data transmission. All the above described signals are applied directly or indirectly to AND gates 402 through 406. The following table indicates the status, high or low, of the inputs to AND gate 402 through 406. High inputs denote an active signal and low inputs denote an inactive active signal. The data and jam signals are wave forms having oscillating transmission states and are denoted by the symbols D and J, respectively.

TABLE 1

| Receipt of Data Transmission From Data Communication Network to Device 110-0 | | |
|---|---|---|
| SIGNALS APPLIED TO GATE 402 | | GENERATED OUTPUT |
| Inverted MAD | : 1 | 0 on path 413 |
| Inverted RTT | : 0 | |
| Activity | : 0 | |
| DATA 211 | : D | |
| SIGNALS APPLIED TO GATE 403 | | GENERATED OUTPUT |
| Inverted MAD | : 1 | D on path 414 |
| RTT | : 1 | |
| DATA 211 | : D | |
| Inverted Secure Data | : 1 | |
| SIGNALS APPLIED TO GATE 404 | | GENERATED OUTPUT |
| JAM | : J | 0 on path 415 |
| Inverted MAD | : 1 | |
| Inverted RTT | : 0 | |
| Inverted Activity | : 1 | |
| SIGNALS APPLIED TO GATE 405 | | GENERATED OUTPUT |
| JAM | : J | 0 on path 416 |
| Inverted MAD | : 1 | |
| RTT | : 1 | |
| Secure Data | : 0 | |
| SIGNALS APPLIED TO GATE 406 | | GENERATED OUTPUT |
| MAD | : 0 | 0 on path 417 |
| JAM | : J | |

The above described input signals enable regulators 204-0 and allow the received data transmission to extend through OR gate 401 to RECV data path 218-0. OR gate 401 applies the received data to line transceiver 205-0 over path 218-0. Transceiver 205-0 drives the received data to T/R device 110-0 over path 105-0.

Assume, now, that T/R device 110-0 is generating a data transmission to the data communication network illustrated in FIG. 1, and that no other data transmissions are presently occurring. T/R device 110-0 applies the generated data to transceiver 205-0 over path 105-0. Transceiver 205-0 drives the transmitted data to regulator 204-0 over XMIT path 219-0. In response to the data transmission on path 219-0, activity detector 407 detects transmission activity and generates a high signal over activity path 215-0. The data on XMIT path 302-0 is applied to AND gate 408. AND gate 408 applies the transmitted data to controller 203 over path 216-0. As previously described, transmitted data from the transmitting T/R device 110-0 is "echoed back" by controller 203 to the originating T/R device 110-0 over data path 211. The signal on path 211 indicates the presence of data. The RTT signal is not active at this time since there is no incoming data transmission and therefore, processor 200 applies a low over path 206. Additionally, as previously described, no secure data signal is present and therefore, a low is applied over path 217-0. The secure data signal is treated as a "don't-care" signal under the above-described conditions and therefore, is denoted as an "X" on FIG. 2. Since only one T/R device is presently transmitting, the MAD signal applied over regulator control 214-0 to path 310 is a low. However, as previously described, the jam signal on path 308 as applied over regulator control 214-0 is active. The above described signals are applied, directly or indirectly, to AND gates 402 through 406. The signals applied to the AND gates 402 through 406 and the generated output from AND gates 402 through 406 are shown on Table 2.

TABLE 2

Transmission of Data to Data Communication Network From Device 110-0

| SIGNALS APPLIED TO GATE 402 | | GENERATED OUTPUT |
|---|---|---|
| Inverted MAD | : 1 | D on path 413 |
| Inverted RTT | : 1 | |
| Activity | : 1 | |
| DATA 211 | : D | |

| SIGNALS APPLIED TO GATE 403 | | GENERATED OUTPUT |
|---|---|---|
| Inverted MAD | : 1 | 0 on path 414 |
| RTT | : 0 | |
| DATA 211 | : D | |
| Inverted Secure Data | : X | |

| SIGNALS APPLIED TO GATE 404 | | GENERATED OUTPUT |
|---|---|---|
| JAM | : J | 0 on ath 415 |
| Inverted MAD | : 1 | |
| Inverted RTT | : 1 | |
| Inverted Activity | : 0 | |

| SIGNALS APPLIED TO GATE 405 | | GENERATED OUTPUT |
|---|---|---|
| JAM | : J | 0 on path 416 |
| Inverted MAD | : 1 | |
| RTT | : 0 | |
| Secure Data | : X | |

| SIGNALS APPLIED TO GATE 406 | | GENERATED OUTPUT |
|---|---|---|
| MAD | : 0 | 0 on path 417 |
| JAM | : J | |

In response to the combination of signals generated by AND gates 402 through 406, OR gate 401 is enabled and the "echo-back" data is not inhibited from extending through OR gate 401 over receive path 218-0 via line transceiver 205-0. Transceiver 205-0 drives the "echo-back" data to T/R device 110-0.

Assume, now, that a data packet of information is received from the network and the destination T/R device is other than T/R device 110-0. The following conditions exist for securing the data transmission from a non-destination T/r device 110-0. As previously described with respect to incoming data transmissions, an RTT signal is generated and a high signal is applied over path 206 to regulator 204-0. However, since regulator 204-0 is not associated with the destination station, a secure data signal is also applied to regulator 204-0 over path 217-0. The secure data signal when active is a high. As previously described, the jam signal is active. Since multiple data transmissions are not present, the MAD signal is inactive, i.e. low. Table 3 indicates the status of each signal, i.e. active, or non-active as received by regulator 204-0.

TABLE 3

Receipt of Data Transmission From Data Communication Network to One of a Plurality of Devices 110-1 Through 110-n

| SIGNALS APPLIED TO GATE 402 | | GENERATED OUTPUT |
|---|---|---|
| Inverted MAD | : 1 | 0 on path 413 |
| Inverted RTT | : 0 | |
| Activity | : 0 | |
| DATA 211 | : D | |

TABLE 3-continued

Receipt of Data Transmission From Data Communication Network to One of a Plurality of Devices 110-1 Through 110-n

| SIGNALS APPLIED TO GATE 403 | | GENERATED OUTPUT |
|---|---|---|
| Inverted MAD | : 1 | 0 on path 414 |
| RTT | : 1 | |
| DATA 211 | : D | |
| Inverted Secure Data | : 0 | |

| SIGNALS APPLIED TO GATE 404 | | GENERATED OUTPUT |
|---|---|---|
| JAM | : J | 0 on path 415 |
| Inverted MAD | : 1 | |
| Inverted RTT | : 0 | |
| Inverted Activity | : 1 | |

| SIGNALS APPLIED TO GATE 405 | | GENERATED OUTPUT |
|---|---|---|
| JAM | : J | J on path 416 |
| Inverted MAD | : 1 | |
| RTT | : 1 | |
| Secure Data | : 1 | |

| SIGNALS APPLIED TO GATE 406 | | GENERATED OUTPUT |
|---|---|---|
| MAD | : 0 | 0 on path 417 |
| JAM | : J | |

The signals combine together to inhibit the transmission of data to the non-destination T/R device 110-0 and allow the jam signal to be applied through OR gate 401 over receive path 218-0. The jam signal is extended to station 110-0 over path 105-0. The secure data signal provides for the transmission of proprietary information to a single identified destination T/R device.

Table 4 indicates the status of the received signal as applied to T/R device 110-0 when T/R device 110-0 is not the T/R device originating a data transmission. The generation of each active signal under these conditions has been previously described. These previously described signals are directly or indirectly applied to AND gates 402 through 406 which enable the jam signal to be applied through OR gate 401 to path 218-0. This prevents the "echo-back" data from being received by a non-destination T/R device.

TABLE 4

Transmission of Data to Data Communication Network From One of a Plurality of Devices 110-1 through 110-n

| SIGNALS APPLIED TO GATE 402 | | GENERATED OUTPUT |
|---|---|---|
| Inverted MAD | : 1 | 0 on path 413 |
| Inverted RTT | : 1 | |
| Activity | : 0 | |
| DATA 211 | : D | |

| SIGNALS APPLIED TO GATE 403 | | GENERATED OUTPUT |
|---|---|---|
| Inverted MAD | : 1 | 0 on path 414 |
| RTT | : 0 | |
| DATA 211 | : D | |
| Inverted Secure Data | : X | |

| SIGNALS APPLIED TO GATE 404 | | GENERATED OUTPUT |
|---|---|---|
| JAM | : J | J on path 415 |
| Inverted MAD | : 1 | |
| Inverted RTT | : 1 | |
| Inverted Activity | : 1 | |

| SIGNALS APPLIED TO GATE 405 | | GENERATED OUTPUT |
|---|---|---|
| JAM | : J | 0 on path 416 |

TABLE 4-continued

Transmission of Data to Data Communication
Network From One of a Plurality of
Devices 110-1 through 110-n

| | |
|---|---|
| Inverted MAD | : 1 |
| RTT | : 0 |
| Secure Data | : X |

| SIGNALS APPLIED TO GATE 406 | GENERATED OUTPUT |
|---|---|
| MAD : 0 | 0 on path 417 |
| JAM : J | |

A final case to consider is that case when multiple data transmissions are occurring simultaneously. The multiple data transmission activity activates the MAD signal and a high signal is applied over path 310 from regulator control path 214-0. This active high signal precludes the application of either "echo-back", transmitted or received data over path 218-0. Under these conditions, each T/R device and, in particular, T/R device 110-0 receives a jam signal which remains in place until only a single data transmission or no data transmission is present. Table 5 indicates the state of each signal to produce a jam signal to all T/R devices when multiple data transmission activity is present.

TABLE 5

Multiple Data Transmission Activity

| SIGNALS APPLIED TO GATE 402 | GENERATED OUTPUT |
|---|---|
| Inverted MAD : 0 | 0 on path 413 |
| Inverted RTT : X | |
| Activity : X | |
| DATA 211 : D | |

| SIGNALS APPLIED TO GATE 403 | GENERATED OUTPUT |
|---|---|
| Inverted MAD : 0 | 0 on path 414 |
| RTT : X | |
| DATA 211 : D | |
| Inverted Secure Data : X | |

| SIGNALS APPLIED TO GATE 404 | GENERATED OUTPUT |
|---|---|
| JAM : J | 0 on path 415 |
| Inverted MAD : 0 | |
| Inverted RTT : X | |
| Inverted Activity : X | |

| SIGNALS APPLIED TO GATE 405 | GENERATED OUTPUT |
|---|---|
| JAM : J | 0 on path 416 |
| Inverted MAD : 0 | |
| RTT : X | |
| Secure Data : X | |

| SIGNALS TO GATE 406 | GENERATED OUTPUT |
|---|---|
| MAD : 1 | J on path 417 |
| JAM : J | |

In a data communication network wherein a plurality of T/R devices share a common interface, a selective routing and transmission controller and transmit/-receive regulator serve to provide secure data transmissions to a transmitting and receiving one of the T/R devices from among a plurality of T/R devices. During the transmission or receipt of a single data packet of information by an originating or a destination T/R device, all non-originating and non-destination T/R devices receive a jam signal. The jam signal prevents the non-originating and non-destination T/R devices from eavesdropping on the data transmission. If multiple data transmission activity is detected, then all T/R devices receive a jam signal until such time as no further transmissions are present or a single data transmission is detected. In the above described manner, data transmissions of a proprietary nature can occur among T/R devices sharing the processing operations of a common interface.

What is claimed is:

1. In a data communication network interconnecting a plurality of data terminal devices via corresponding interface devices where a group of said data terminal devices share a single interface device, a data security arrangement in said single interface device for providing privacy of data transmissions comprising:
   means for detecting the origination of a data transmission for one of said group of data terminal devices;
   means responsive to a detected data transmission origination for identifying the destination one of said group of data terminal devices associated with said data transmission origination;
   means responsive to said identifying means for transmitting said data transmission only via an individual, non-broadcast link to said destination data terminal device; and
   means responsive to said identifying means for transmitting a spurious data transmission, coexistent with said data transmission, via individual, non-broadcast links to all of said group of data terminal devices save said destination data terminal device.

2. The arrangement of claim 1 further comprising:
   a plurality of transmit/receive regulator devices associated on a one-to-one basis with said data terminal devices of said group for interconnecting said data terminal devices of said group to said single interface device; and
   means responsive to said identifying means for enabling the one of said regulator devices associated with said destination data terminal device to transmit said data transmission to said destination data terminal device.

3. The arrangement of claim 2 further comprising:
   means for generating said spurious data transmission; and
   means responsive to said identifying means for enabling all of said regulator devices, save said regulator device associated with said destination data terminal device, for transmitting said spurious data transmission to all of said group of data terminal devices, save said destination data terminal device.

4. The arrangement of claim 3 further comprising:
   means for detecting the termination of said data transmission; and
   means responsive to a detected data transmission termination for disabling said generating means to terminate said spurious data transmission.

5. The arrangement of claim 1 further comprising:
   means for detecting multiple concurrent data transmissions; and
   wherein said spurious data transmission means are responsive to a detected multiple concurrent data transmission for transmitting said spurious data transmission to all of said group of data terminal devices.

6. In a data communication network interconnecting a plurality of data terminal devices via interface devices where a group of said data terminal devices share a single interface device, a data transmission security arrangement in said single interface device for providing privacy of data transmissions comprising:

means for detecting the origination of a data transmission between said interface device and one of said group of data terminal devices associated with said interface device; and means responsive to a detected data transmission origination for transmitting a spurious data transmission, coexistent with said data transmission, via individual, non-broadcast links to all of said data terminal devices in said group of data terminal devices save said one data terminal device.

7. The arrangement of claim 6 further comprising:

a plurality of transmit/receive regulator devices associated on a one-to-one basis with said data terminal devices of said group for interconnecting said data terminal devices of said group to said single interface device; and means responsive to said detecting means for enabling the one of said regulator devices associated with said one data terminal device to transmit said data transmission to said one data terminal device.

8. The arrangement of claim 7 further comprising:

means for generating said spurious data transmission; and means responsive to said detecting means for enabling all of said regulator devices, save said regulator device associated with said one data terminal device, for transmitting said spurious data transmission to all of said group of data terminal devices, save said one data terminal device.

9. The arrangement of claim 7 further comprising:

means for generating said spurious data transmission; and means responsive to said detecting means for enabling all of said regulator devices, save the regulator device associated with said one data terminal device, for transmitting said spurious data transmission to all of said data terminal devices in said group save said one data terminal device.

10. The arrangement of claim 8 or 9 further comprising:

means for detecting the termination of said data transmission; and means responsive to a detected data transmission termination for disabling said generating means to terminate said spurious data transmission.

11. The arrangement of claim 6 further comprising:

means for detecting multiple concurrent data transmissions; and wherein said spurious data transmission means are responsive to a detected multiple concurrent data transmission for transmitting said spurious data transmission to all of said group of data terminal devices.

12. In a data communication network interconnecting a plurality of data terminal devices via corresponding interface devices where a group of said data terminal devices share a single interface device, a data transmission security arrangement in said single interface device for providing privacy of data transmissions comprising:

means for detecting the origination of a data transmission for one of said group of data terminal devices;

means responsive to a detected data transmission origination for identifying the destination one of said group of data terminal devices associated with said data transmission origination; and means responsive to said identifying means for interrupting the transmission of said data transmission via individual, non-broadcast links to all of said group of data terminal devices save said destination data terminal device.

13. The arrangement of claim 12 wherein said interrupting means comprises:

means for generating a spurious data transmission; and means responsive to said identifying means for transmitting said spurious data transmission, coexistent with said data transmission, to all of said group of data terminal devices save said destination data terminal device.

14. The arrangement of claim 13 further comprising:

a plurality of transmit/receive regulator devices associated on a one-to-one basis with said data terminal devices of said group for interconnecting said data terminal devices of said group to said single interface device; and means responsive to said identifying means for enabling the one of said regulator devices associated with said destination data terminal device to transmit said data transmission to said destination data terminal device.

15. The arrangement of claim 14 further comprising:

means responsive to said identifying means for enabling all of said regulator devices, save said regulator device associated with said destination data terminal device, for transmitting said spurious data transmission to all of said group of data terminal devices, save said destination data terminal device.

16. The arrangement of claim 15 further comprising:

means for detecting the termination of said data transmission; and means responsive to a detected data transmission termination for disabling said generating means to terminate said spurious data transmission.

17. The arrangement of claim 13 further comprising:

means for detecting multiple concurrent data transmissions; and wherein said interrupting means are responsive to a detected multiple concurrent data transmission for interrupting said data transmission to all of said group of data terminal devices.

18. In a data communication network interconnecting a plurality of data terminal devices via corresponding interface devices where a group of said data terminal devices share a single interface device, a data security transmission method for providing privacy of data transmissions comprising the steps of:

detecting the origination of a data transmission for one of said group of data terminal devices;

identifying the destination one of said group of data terminal devices associated with said data transmission origination;

transmitting said data transmission via an individual, non-broadcast link only to said destination data terminal device; and transmitting a spurious data transmission, coexistent with said data transmission, via individual, non-broadcast links to all of said group of data terminal devices save said destination data terminal device.

19. The method of claim 18, wherein a plurality of transmit/receive regulator devices are associated on a one-to-one basis with said dta terminal devices of said group for interconnecting said data terminal devices of said group to said single interface device, further comprising the step of:
  enabling the one of said regulator devices associated with said destination data terminal device to transmit said data transmission to said destination data terminal device.

20. The method of claim 19 further comprising the steps of:
  generating said spurious data transmission; and
  enabling all of said regulator devices, save said regulator device associated with said destination data terminal device, to transmit said spurious data transmission to all of said group of data terminal devices, save said destination data terminal device.

21. The method of claim 20 further comprising the steps of:
  detecting the termination of said data transmission; and
  disabling in response to a detected data transmission termination said generating means to terminate said spurious data transmission.

22. The method of claim 18 further comprising the steps of:
  detecting multiple concurrent data transmissions; and
  transmitting in response to a detected multiple concurrent data transmission said spurious data transmission to all of said group of data terminal devices.

23. In a data communication network interconnecting a plurality of data terminal devices via interface devices where a group of said data terminal devices share a single interface device, a method of data transmission security for providing privacy of data transmissions comprising the steps of:
  detecting the origination of a data transmission between said interface device and one of said group of data terminal devices associated with said interface device; and
  transmitting in response to a detected data transmission origination a spurious data transmission, coexistent with said data transmission, via individual, non-broadcast links to all of said data terminal devices in said group of data terminal devices save said one data terminal device.

24. The method of claim 23, wherein a plurality of transmit/receive regulator devices are associated on a one-to-one basis with said data terminal devices of said group for interconnecting said data terminal devices of said group to said single interface device, further comprising the step of:
  enabling the one of said regulator devices associated with said one data terminal device to transmit said data transmission to said one data terminal device.

25. The method of claim 24 further comprising the steps of:
  generating said spurious data transmission; and
  enabling all of said regulator devices, save said regulator device associated with said one data terminal device, for transmitting said spurious data transmission to all of said group of data terminal devices, save said one data terminal device.

26. The method of claim 25 further comprising the steps of:
  generating said spurious data transmission; and
  enabling all of said regulator devices, save the regulator device associated with said one data terminal device, for transmitting said spurious data transmission to all of said data terminal devices in said group save said one data terminal device.

27. The method of claim 25 or 26 further comprising the steps of:
  detecting the termination of said data transmission; and
  disabling in response to a detected data transmission termination said generating means to terminate said spurious data transmission.

28. The method of claim 23 further comprising the steps of:
  detecting multiple concurrent data transmissions; and
  transmitting in response to a detected multiple concurrent data transmission said spurious data transmission to all of said group of data terminal devices.

29. In a data communication network interconnecting a plurality of data terminal devices via corresponding interface devices where a group of said data terminal devices share a single interface device, a method of providing data transmission security for providing privacy of data transmissions comprising the steps of:
  detecting the origination of a data transmission for one of said group of data terminal devices;
  identifying in response to a detected data transmission origination the destination one of said group of data terminal devices associated with said data transmission origination; and
  interrupting the transmission of said data transmission via individual, non-broadcast links to all of said group of data terminal devices save said destination data terminal device.

30. The method of claim 29 further comprising the steps of:
  generating a spurious data transmission; and
  transmitting said spurious data transmission, coexistent with said data transmission, to all of said group of data terminal devices save said destination data terminal device.

31. The method of claim 29, wherein a plurality of transmit/receive regulator devices are associated on a one-to-one basis with said data terminal devices of said group for interconnecting said data terminal devices of said group to said single interface device, further comprising the step of:
  enabling the one of said regulator devices associated with said destination data terminal device to transmit said data transmission to said destination data terminal device.

32. The method of claim 31 further comprising the steps of:
  generating said spurious data transmission; and
  enabling all of said regulator devices, save said regulator device associated with said destination data terminal device, for transmitting said spurious data transmission to all of said group of data terminal devices, save said destination data terminal device.

33. The method of claim 32 further comprising the steps of:
  detecting the termination of said data transmission; and
  disabling in response to a detected data transmission termination said generating means to terminate said spurious data transmission.

34. The method of claim 29 further comprising the steps of:
  detecting multiple concurrent data transmissions; and
  transmitting in response to a detected multiple concurrent data transmission said spurious data transmission to all of said group of data terminal devices.

* * * * *

UNITED STATES PATENT AND TRADEMARK OFFICE
CERTIFICATE OF CORRECTION

PATENT NO. : 4,901,348

DATED : February 13, 1990

INVENTOR(S) : John M. Nichols and Richard A. Windhausen

It is certified that error appears in the above-identified patent and that said Letters Patent is hereby corrected as shown below:

IN THE CLAIMS

Column 19, lines 14 and 15, "associcated" should be "associated";
Column 20, line 67, "dta" should be "data";
Column 21, line 61, "claim 25" should be "claim 24".

Signed and Sealed this

Nineteenth Day of November, 1991

Attest:

HARRY F. MANBECK, JR.

*Attesting Officer*                *Commissioner of Patents and Trademarks*